US010684138B2

(12) United States Patent
Takeda

(10) Patent No.: US 10,684,138 B2
(45) Date of Patent: Jun. 16, 2020

(54) PATH SELECTION ASSISTANCE DEVICE, PATH SELECTION ASSISTANCE METHOD, AND COMPUTER PROGRAM

(71) Applicant: It's MMC Co., Ltd., Osaka (JP)

(72) Inventor: Masafumi Takeda, Osaka (JP)

(73) Assignee: IT'S MMC CO., LTD., Osaka (JP)

( * ) Notice: Subject to any disclaimer, the term of this patent is extended or adjusted under 35 U.S.C. 154(b) by 151 days.

(21) Appl. No.: 15/756,333

(22) PCT Filed: Sep. 2, 2016

(86) PCT No.: PCT/JP2016/075804
§ 371 (c)(1),
(2) Date: Jun. 21, 2018

(87) PCT Pub. No.: WO2017/038978
PCT Pub. Date: Mar. 9, 2017

(65) Prior Publication Data
US 2019/0170536 A1 Jun. 6, 2019

(30) Foreign Application Priority Data
Sep. 4, 2015 (JP) .................... 2015-174347

(51) Int. Cl.
*G01C 21/36* (2006.01)
*G01C 21/32* (2006.01)
(Continued)

(52) U.S. Cl.
CPC ......... *G01C 21/3667* (2013.01); *G01C 21/32* (2013.01); *G08G 1/005* (2013.01); *G09B 29/00* (2013.01); *G09B 29/10* (2013.01)

(58) Field of Classification Search
CPC .... G01C 21/32; G01C 21/3667; G08G 1/005; G09B 29/00; G09B 29/10
See application file for complete search history.

(56) References Cited

U.S. PATENT DOCUMENTS 4,550,317 A * 10/1985 Moriyama ........... G09B 29/106
340/988
6,434,479 B1 * 8/2002 Kondou ................ G01S 5/0027
340/988
(Continued)

FOREIGN PATENT DOCUMENTS

JP 09-126797 A 5/1997
JP 2006-92470 4/2006
(Continued)

OTHER PUBLICATIONS

International Search Report dated Nov. 22, 2016 in corresponding International Patent Application No. PCT/JP2016/075804.

*Primary Examiner* — Babar Sarwar
(74) *Attorney, Agent, or Firm* — Staas & Halsey LLP

(57) ABSTRACT

Provided are a path selection assistance device, a path selection assistance method, and a computer program, for displaying, in a recognizable manner, paths that a user can select from a current position to a destination to enable the user to select a path, by which the user can reliably reach the destination, according to the user's values. Information indicating the paths that the user can select is displayed. Position information on the current position of the user and the current position(s) of one or more targets is acquired and position information on a block which is a closed region surrounded by paths that the user can travel is acquired. Blocks existing between the current position of the user and the current position(s) of one or more targets are extracted and the display mode of the blocks thus extracted is updated to display them.

20 Claims, 15 Drawing Sheets

(51) Int. Cl.
*G08G 1/005* (2006.01)
*G09B 29/10* (2006.01)
*G09B 29/00* (2006.01)

(56) References Cited

U.S. PATENT DOCUMENTS

| | | | |
|---|---|---|---|
| 7,199,800 B2* | 4/2007 | Ogawa | G01C 21/32 345/536 |
| 7,734,413 B2* | 6/2010 | Sakashita | G01C 21/3647 340/990 |
| 7,746,343 B1* | 6/2010 | Charaniya | G06F 16/2428 345/428 |
| 8,478,521 B2* | 7/2013 | Min | G01C 21/00 342/175 |
| 8,698,649 B2* | 4/2014 | Denaro | B60W 40/072 340/905 |
| 9,470,542 B2* | 10/2016 | Lukas | G01C 21/3647 |
| 9,530,314 B2* | 12/2016 | Maitra | G08G 1/123 |
| 2001/0037305 A1* | 11/2001 | Mochizuki | G08G 1/096811 705/52 |
| 2003/0035566 A1* | 2/2003 | Ueki | G01B 11/2441 382/108 |
| 2004/0059500 A1* | 3/2004 | Nakano | G01C 21/3647 701/431 |
| 2008/0027635 A1* | 1/2008 | Tengler | G01C 21/36 701/533 |
| 2008/0221790 A1* | 9/2008 | Min | G01C 21/3647 701/533 |
| 2010/0114484 A1* | 5/2010 | Kida | G06F 16/29 701/532 |
| 2011/0130951 A1* | 6/2011 | Lee | G01C 21/32 701/532 |
| 2011/0172905 A1* | 7/2011 | Schroder | G01C 21/343 701/533 |
| 2011/0295499 A1* | 12/2011 | Nozoe | G01C 21/3635 701/457 |
| 2014/0052372 A1* | 2/2014 | Berus | G01C 21/3461 701/533 |
| 2016/0370190 A1* | 12/2016 | Gotoh | G06F 16/444 |
| 2019/0272431 A1* | 9/2019 | Oami | G08G 1/04 |

FOREIGN PATENT DOCUMENTS

| | | |
|---|---|---|
| JP | 2007-285733 | 11/2007 |
| JP | 2011-247860 A | 12/2011 |
| JP | 4911478 | 1/2012 |
| JP | 2014-79010 | 5/2014 |
| JP | 2015-111051 | 6/2015 |
| KR | 10-205-0120982 A | 12/2005 |
| KR | 10-2015-0039655 A | 4/2015 |
| WO | WO 2010/150323 | 12/2010 |

* cited by examiner

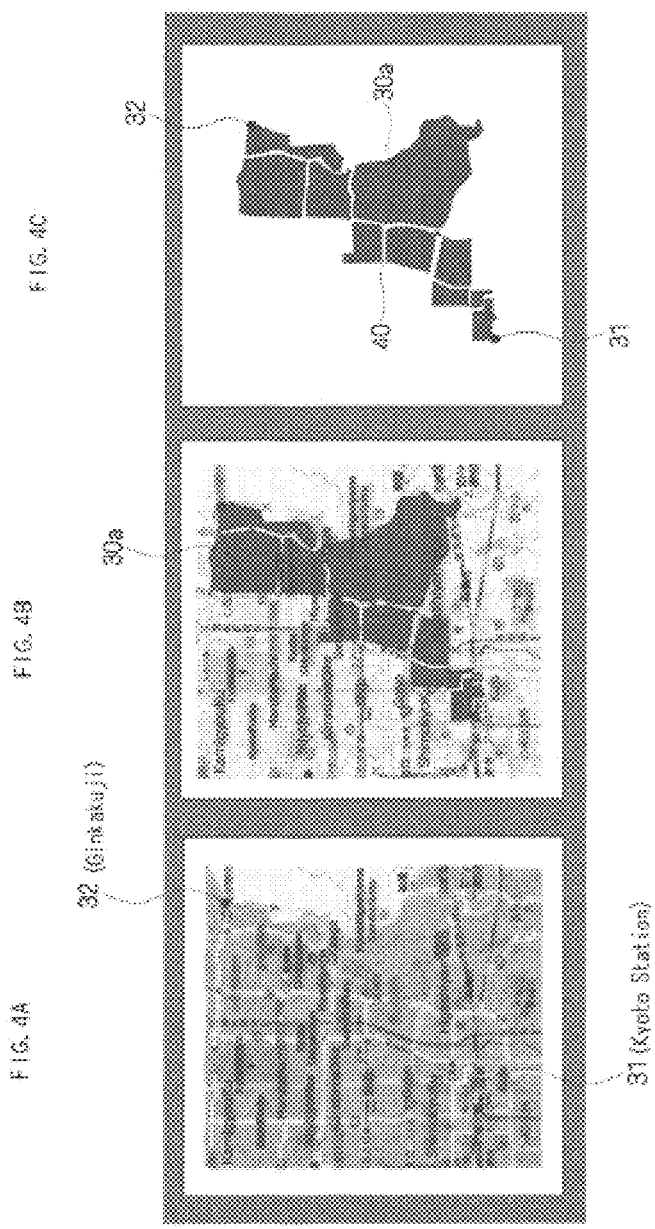

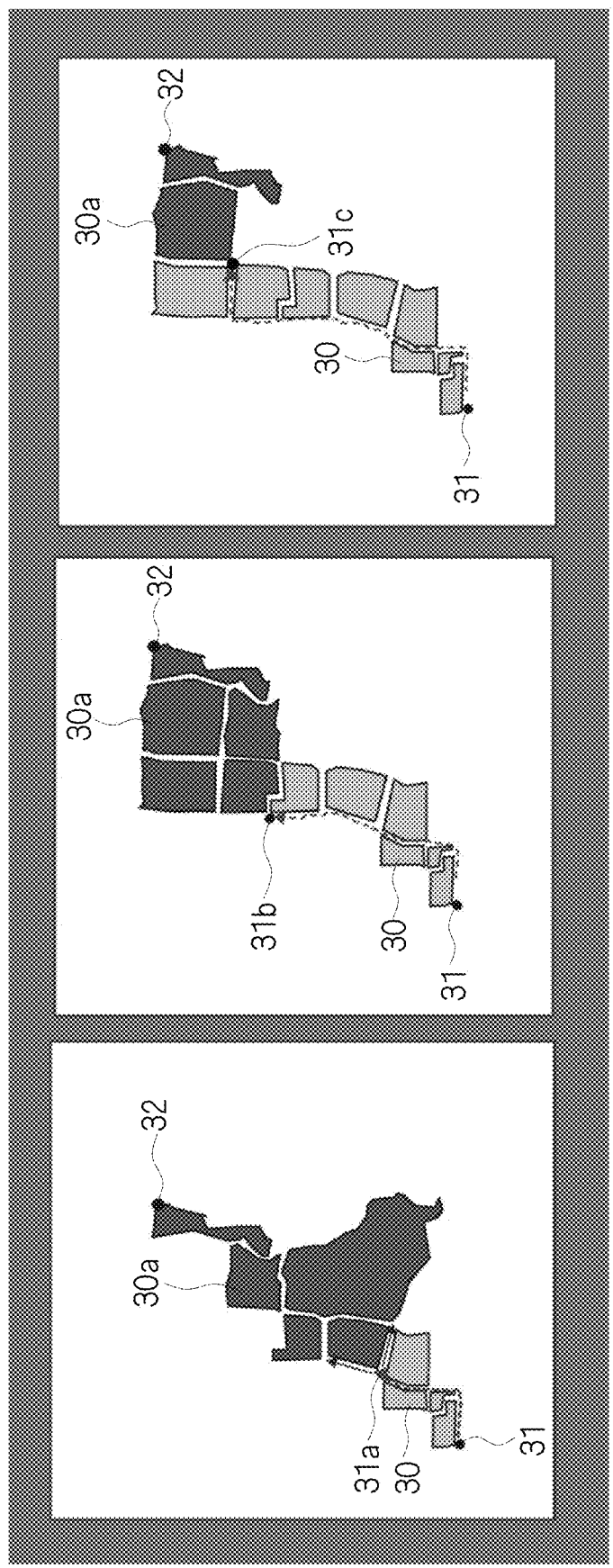

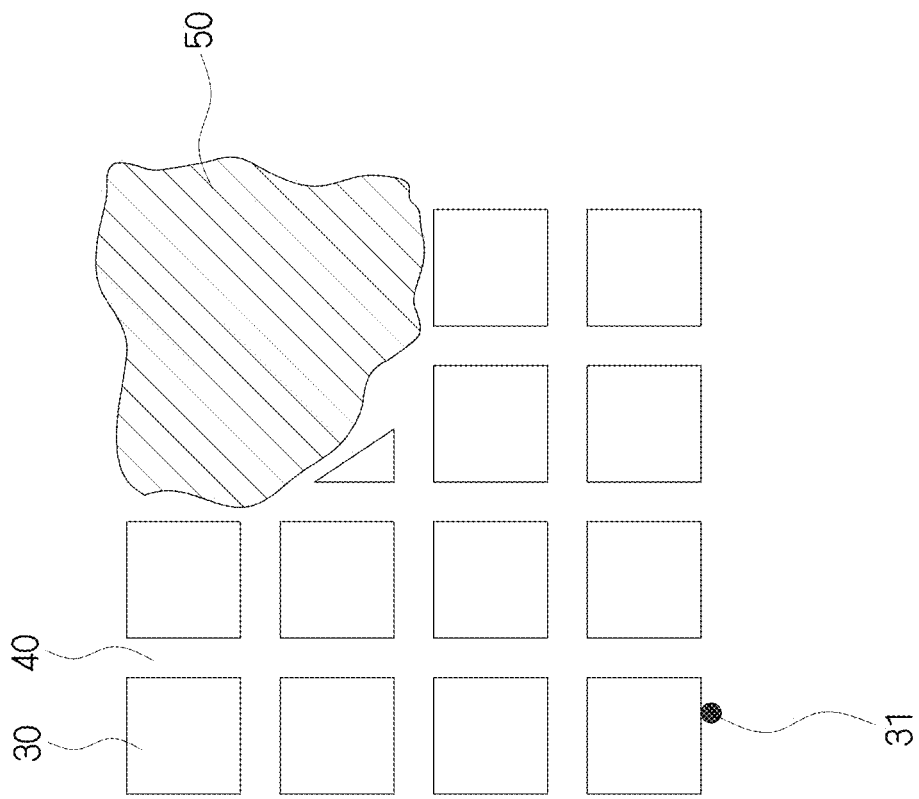
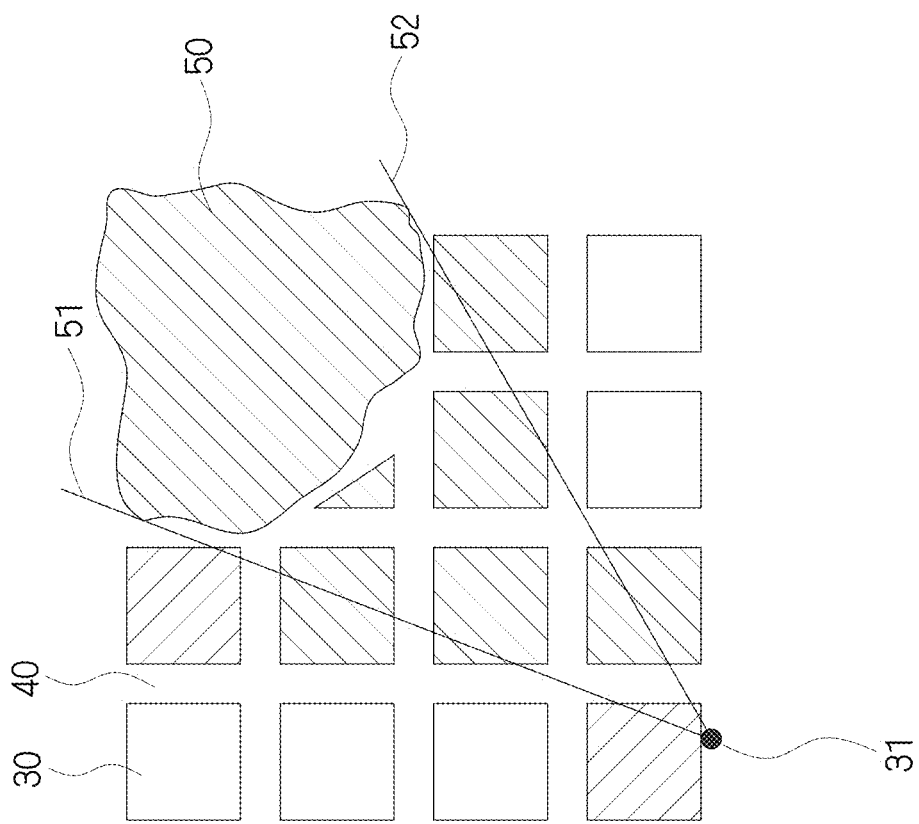
FIG. 12A
FIG. 12B

PATH SELECTION ASSISTANCE DEVICE, PATH SELECTION ASSISTANCE METHOD, AND COMPUTER PROGRAM

CROSS-REFERENCE TO RELATED APPLICATION

This application is a U.S. National Stage Application which claims the benefit under 35 U.S.C. § 371 of PCT International Patent Application No. PCT/JP2016/075804, filed Sep. 2, 2016, which claims the priority benefit under 35 U.S.C. § 119 of Japanese Patent Application No. 2015-174347, filed Sep. 4, 2015, the contents of all of which are incorporated herein by reference.

TECHNICAL FIELD

The present invention relates to a path selection assistance device, a path selection assistance method, and a computer program that can display paths that a user can select from a current position to a destination.

BACKGROUND ART

In Japan, car navigation systems are widely distributed. Many navigation systems, which are not only for cars, have been developed that select and display the optimal path from a current position to a destination. However, there are surprisingly few navigation systems that give the user the freedom to choose a path.

For example, Patent Document 1 discloses a position information providing system that generates and displays, as ambiguous position information, a polygon region that indicates a block (a region surrounded by roads, a city block) including the current position so as to display the current position ambiguously when displaying the position. In Patent Document 1, as compared to the case of displaying the current position with a dot on a map, the position information of the current position of the owner of a terminal device can be displayed using ambiguous position information that covers a certain range, so that the owner of the terminal device is provided with many selectable paths within a certain range.

Furthermore, Patent Document 2 discloses an area entering/exiting information notifying system in which when setting an area where a person to be determined is present, an arbitrary region can be registered as the area using a polygon in addition to a circle and a polygonal shape. Patent Document 2 is characterized in that when entering into/exiting from the region registered as the area is confirmed, the display mode of said region is changed to display it. That is, since the current position of the person to be determined can be grasped on an area basis, which path to select and travel is left to be determined by the person to be determined.

PRIOR ART DOCUMENTS

Patent Documents

[Patent Document 1] JP2014-079010A
[Patent Document 2] JP4911478B

DISCLOSURE OF INVENTION

Problem to be Solved by the Invention

In a conventional navigation system in which the system calculates the optimal path to display it, there are the following problems particularly in the case of moving slowly by foot. That is, the slower the moving speed, the more the number of options of the path such as alleys, main streets, and directions increases relatively, resulting in a tendency to make a mistake in selecting the path. Furthermore, even when the selection of the path is found to be wrong, there are an increasing number of new options at the time and therefore, it is difficult to return to the path intended at the beginning, which has been a problem.

In addition, in Patent Document 1, the position information of the current position of the owner of the terminal device is merely displayed using ambiguous position information. Therefore, for example, although the current position information of the owner of the terminal device can be acquired, the polygon regions indicating all the blocks up to the destination cannot be displayed as ambiguous position information, and it is not necessarily guaranteed that the path selected to the destination is the path which the owner of the terminal device is convinced to select, which has been a problem. Also, when the destination is distant, the paths themselves that can be selected to the destination are not displayed in the first place. Therefore, there is a problem that there is no guarantee of reaching the destination no matter which path is selected.

Furthermore, in Patent Document 2, when entry into a region registered as the area is detected, only the display mode of said region is changed and the candidates for the path to be selected to the destination are not displayed. Therefore, similarly to the Patent Document 1, when the destination is distant, the paths themselves that can be selected to the destination are not displayed in the first place. Accordingly, there is a problem that there is no guarantee of reaching the destination no matter which path is selected.

The present invention was made with such circumstances in mind and it is an object of the present invention to provide a path selection assistance device, a path selection assistance method, and a computer program that can display, in a recognizable manner, the paths that a user can select from a current position to a destination to enable the user to select a path, by which the user can reliably reach the destination, according to the user's values.

Means for Solving Problem

In order to achieve the object described above, a path selection assistance device according to a first aspect of the invention is a path selection assistance device for displaying information indicating paths that a user can select and is characterized by including a position information acquisition means for acquiring position information on a current position of a user and a current position(s) of one or more targets, a block information acquisition means for acquiring position information of a block which is a closed region surrounded by paths that the user can travel, a block extraction means for extracting a block existing between the current position of the user and the current position(s) of one or more targets, and a block display update means for updating the display mode of the block thus extracted to display it.

A path selection assistance device according to a second aspect of the invention is characterized in that in the first aspect of the invention, the block extraction means includes a straight line generation means for generating a straight line connecting the current position of the user and the actual position(s) of the one or more targets and an intersecting block extraction means for extracting a block intersecting the straight line thus generated.

A path selection assistance device according to a third aspect of the invention is characterized in that in the first or second aspect of the invention, the position information acquisition means acquires boundary coordinate values of a region having a predetermined area as the position information on the current position of the target.

A path selection assistance device according to a fourth aspect of the invention is characterized in that in any one of the first to third aspect of the inventions, the block information acquisition means downloads block position information stored on an external computer.

A path selection assistance device according to a fifth aspect of the invention is characterized by, in any one of the first to fourth aspect of the inventions, superimposing map information and the extracted block to display them.

Furthermore, a path selection assistance device according to a sixth aspect of the invention is characterized by, in any one of the first to fifth aspect of the inventions, including a message input/output area in a screen where the extracted block is displayed and a message exchange means for exchanging messages among a plurality of users.

A path selection assistance device according to a seventh aspect of the invention is characterized in that in any one of the first to sixth aspect of the inventions, the target can move.

Next, in order to achieve the object described above, a path selection assistance method according to an eighth aspect of the invention is a path selection assistance method that can be executed with a path selection assistance device for displaying information indicating paths that a user can select, the path selection assistance device including a step of acquiring position information on a current position of a user and an current position(s) of one or more targets, a step of acquiring position information of a block which is a closed region surrounded by paths that the user can travel, a step of extracting a block existing between the current position of the user and the current position(s) of the one or more targets, and a step of updating the display mode of the block thus extracted to display it.

A path selection assistance method according to a ninth aspect of the invention is characterized in that in the eighth aspect of the invention, the path selection assistance device includes a step of generating a straight line connecting the current position of the user and the current position(s) of the one or more targets and a step of extracting a block intersecting the straight line thus generated.

A path selection assistance method according to a tenth aspect of the invention is characterized in that in the eighth or ninth aspect of the invention, the path selection assistance device acquires boundary coordinate values of a region having a predetermined area as the position information on the current position of the target.

A path selection assistance method according to an eleventh aspect of the invention is characterized in that in any one of the eighth to tenth aspect of the inventions, the path selection assistance device downloads block position information stored on an external computer.

A path selection assistance method according to a twelfth aspect of the invention is characterized in that in any one of the eighth to eleventh aspect of the inventions, the path selection assistance device superimposes map information and the extracted block to display them.

A path selection assistance method according to a thirteenth aspect of the invention is characterized in that in any one of the eighth to twelfth aspect of the inventions, the path selection assistance device includes a message input/output area in a screen where the extracted block is displayed and the path selection assistance method includes a step of exchanging messages among a plurality of users.

A path selection assistance method according to a fourteenth aspect of the invention is characterized in that in any one of the eighth to thirteenth aspect of the inventions, the target can move.

Next, in order to achieve the object described above, a computer program according to a fifteenth aspect of the invention is a computer program that can be executed by a path selection assistance device for displaying information indicating paths that a user can select, the path selection assistance device being allowed to function as: a position information acquisition means for acquiring position information on a current position of a user and an current position(s) of one or more targets, a block information acquisition means for acquiring position information of a block which is a closed region surrounded by paths that the user can travel, a block extraction means for extracting a block existing between the current position of the user and the current position(s) of one or more targets, and a block display update means for updating the display mode of the block thus extracted to display it.

A computer program according to a sixteenth aspect of the invention is characterized in that in the fifteenth aspect of the invention, the block extraction means is allowed to function as: a straight line generation means for generating a straight line connecting the current position of the user and the current position(s) of the one or more targets, and an intersecting block extraction means for extracting a block intersecting the straight line thus generated.

A computer program according to a seventeenth invention is characterized in that in the fifteenth or sixteenth aspect of the invention, the position information acquisition means is allowed to function as a means for acquiring boundary coordinate values of a region having a predetermined area as the position information on the current position of the target.

A computer program according to an eighteenth aspect of the invention is characterized in that in any one of the fifteenth to seventeenth aspect of the inventions, the block information acquisition means is allowed to function as a means for downloading block position information stored on an external computer.

A computer program according to a nineteenth aspect of the invention is characterized in that in any one of the fifteenth to eighteenth aspect of the inventions, the path selection assistance device is allowed to function as a means for superimposing map information and the extracted block to display them.

A computer program according to a twentieth aspect of the invention is characterized in that in any one of the fifteenth to nineteenth aspect of the inventions, the path selection assistance device includes a message input/output area in a screen where the extracted block is displayed, and the path selection assistance device is allowed to function as a message exchange means for exchanging messages among a plurality of users.

Effects of the Invention

According to the aspect of the inventions described above, since all the blocks existing between a current position and a destination to be reached can be displayed, the user can select a path that allows the user to reliably reach the destination based on the displayed blocks. Furthermore, particularly even in the case of moving slowly by foot, it is possible to reduce the possibility of wrong path selection.

Even if the path selection was found to be wrong, a new path towards the destination can be easily selected again.

BRIEF DESCRIPTION OF DRAWINGS

FIG. 4 shows diagrams illustrating a block display for a user heading from Kyoto Station to Ginkakuji in the path selection assistance device according to Embodiment 1 of the present invention.

FIG. 5 shows diagrams illustrating changes in the block display due to movements of the path selection assistance device according to Embodiment 1 of the present invention.

FIG. 12 shows a diagram illustrating blocks and a diagram illustrating extracted blocks in a path selection assistance device according to Embodiment 3 of the present invention.

DESCRIPTION OF THE INVENTION

Figure 1:
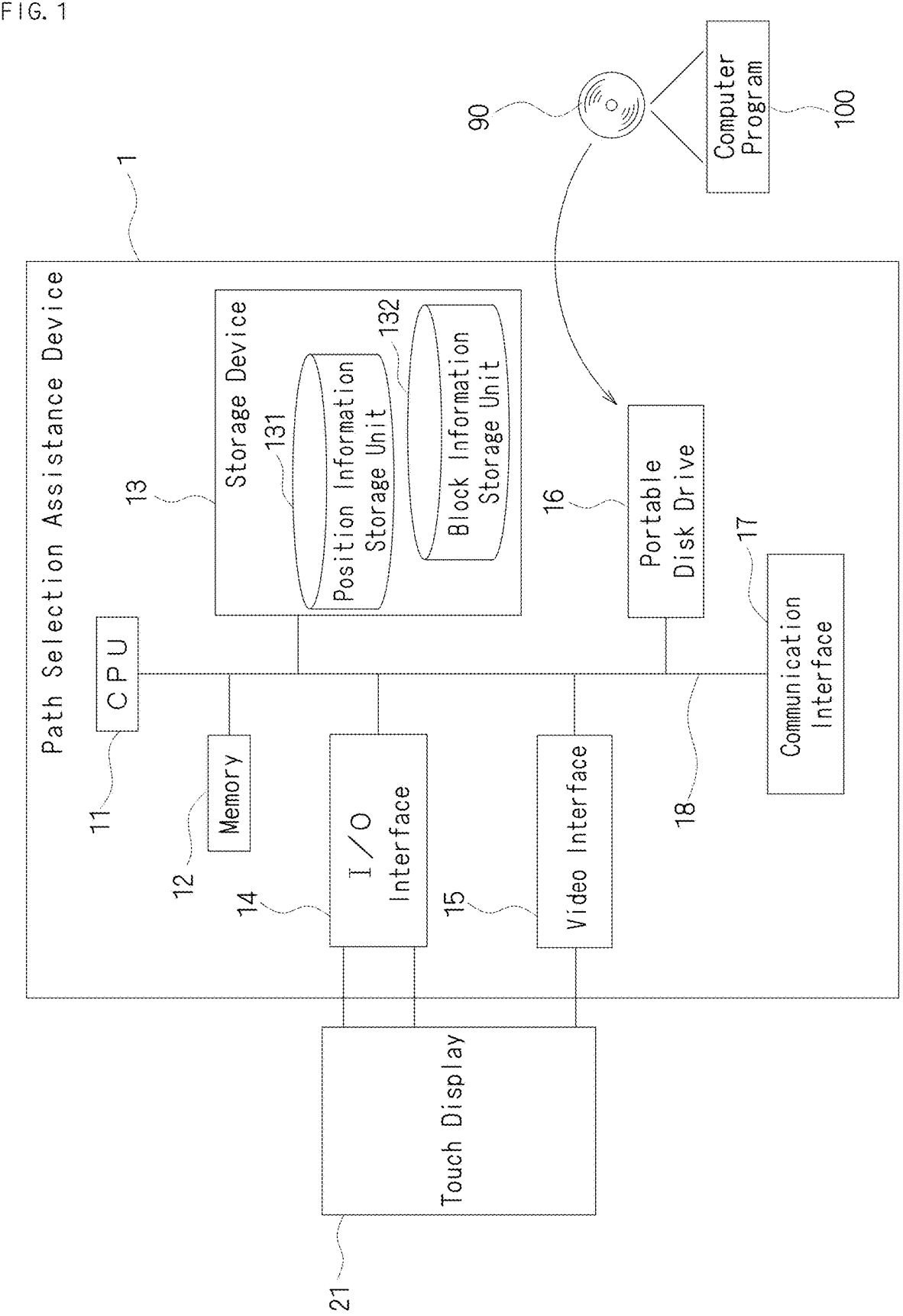
FIG. 1 is a block diagram schematically showing a configuration of a path selection assistance device according to Embodiment 1 of the present invention.

Hereinafter, path selection assistance devices according to embodiments of the present invention will be specifically described with reference to the drawings. The following embodiments do not limit the invention described in the claims, and not all of the combinations of the characteristics described in the embodiments should necessarily be essential for the means for solving problems.

Furthermore, the present invention can be implemented in many different modes and should not be construed as being limited to the description of the embodiments. Identical reference numerals are used for identical elements throughout the embodiments.

In the following embodiments, path selection assistance devices in which a computer program is introduced in a computer system will be described. However, as will be apparent to those skilled in the art, the present invention can be implemented as a computer program, part of which can be executed by a computer. Therefore, the present invention can be embodied as hardware as a path selection assistance device, as software, or as a combination of software and hardware, which can display, in a recognizable manner, paths that a user can select from a current position to a destination to enable the user to select a path, by which the user can reliably reach the destination, according to the user's values. The computer program can be recorded on a recording medium readable by any computer, such as a hard disk, a DVD, a CD, an optical storage device, or a magnetic storage device.

According to the embodiments of the present invention, since all the blocks existing between a current position and a destination to be reached can be displayed, the user can select a path that allows the user to reliably reach the destination based on the displayed blocks. Furthermore, particularly even in the case of moving slowly by foot, it is possible to reduce the possibility of wrong path selection. Even if the path selection was found to be wrong, a new path towards the destination can be easily selected again.

Embodiment 1

FIG. 1 is a block diagram schematically showing a configuration of a path selection assistance device according to Embodiment 1 of the present invention. Preferably, the path selection assistance device 1 according to Embodiment 1 of the present invention is a portable terminal device that can be carried by a user. This is because the current position of the path selection assistance device indicates the current position of the user.

The path selection assistance device 1 according to Embodiment 1 of the present invention is composed of at least a CPU (central processing unit) 11, a memory 12, a storage device 13, an I/O interface 14, a video interface 15, a portable disk drive 16, a communication interface 17, and an internal bus 18 that connects the above-mentioned hardware.

The CPU 11 is connected to each of the above-mentioned hardware of the path selection assistance device 1 through the internal bus 18, controls the operations of each of the above-mentioned hardware, and also executes various software-like functions according to a computer program 100 stored in the storage device 13. The memory 12 is composed of a volatile memory such as an SRAM or an SDRAM. In the memory 12, a load module is developed when the computer program 100 is executed, and the memory 12 stores, for example, temporary data generated at the time of execution of the computer program 100.

The storage device 13 is composed of a built-in fixed storage device (a hard disk), a ROM, etc. The computer program 100 stored in the storage device 13 is downloaded by the portable disk drive 16 from a portable recording medium 90 such as a DVD or a CD-ROM containing information such as a program and data recorded therein, and at the time of execution, it is developed from the storage device 13 to the memory 12 to be executed. Of course, it may be a computer program downloaded from an external computer connected through the communication interface 17.

The storage device 13 includes a position information storage unit 131 and a block information storage unit 132. The position information storage unit 131 stores information on the position of the current position of a user carrying the path selection assistance device 1 and information on the position of the current position of a destination at the same time point. Preferably, the information on the position of the current position of the user is acquired as a coordinate value using, for example, GPS, because it changes in real time. Furthermore, with respect to the information on the position of the destination, when the destination is fixed, the coordinate value may be stored. When the destination moves, it is similarly acquired as a coordinate value using, for example, GPS.

The block information storage unit 132 stores information such as the coordinate value of each block, with a closed region surrounded by paths that the user can travel being taken as one block. Of course, all the block information may be stored or may be stored in an external computer having a large-capacity storage device and only the block information on the necessary blocks may be downloaded to be stored.

The communication interface 17 is connected to the internal bus 18 and can be connected to an external network such as the Internet, a LAN, or a WAN to exchange data with, for example, an external computer.

The I/O interface 14 is connected to input devices such as a keyboard and a mouse and accepts data input. In Embodiment 1, since the path selection assistance device 1 is a portable terminal device that can be carried, the input device is a touch display 21. The video interface 15 is connected to a display device such as a CRT display or a liquid crystal display. In Embodiment 1, it is connected to the touch display 21 and displays the position information of a current position and the position information of a destination that, for example, are superimposed on map information while allowing paths that can be selected to be visually checked.

Figure 2:
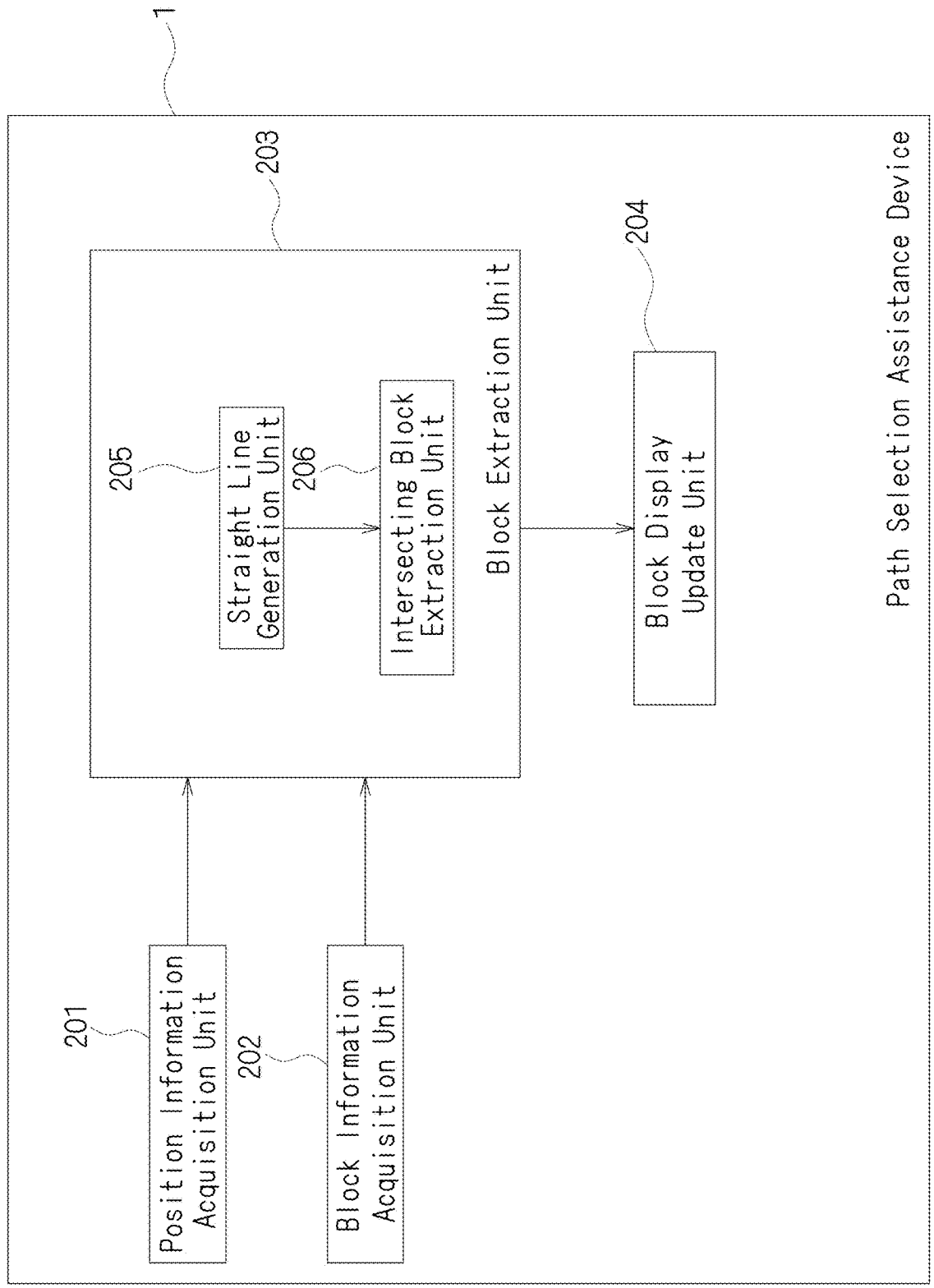
FIG. 2 is a functional block diagram of the path selection assistance device according to Embodiment 1 of the present invention.

FIG. 2 is a functional block diagram of the path selection assistance device 1 according to Embodiment 1 of the present invention. In FIG. 2, a position information acquisition unit 201 of the path selection assistance device 1 acquires the position information on the current position of a user and the current position(s) of one or more targets (destinations).

The position information acquisition unit 201 acquires the coordinate value of the current position of the path selection assistance device 1 using, for example, GPS. On the premise that the user carries the path selection assistance device 1, the current position of the path selection assistance device 1 is taken as the current position of the user.

Furthermore, the position information acquisition unit 201 also acquires the coordinate value of the destination (the coordinate value of the current position when the destination can move). When the destination is a fixed place such as a facility or a place, the stored coordinate value is read out. In the case where the destination can move, for example, for the purpose of meeting a friend, the position information acquisition unit 201 acquires the coordinate value of the current position of the path selection assistance device 1 carried by the friend.

A block information acquisition unit 202 acquires position information on a block which is a closed region surrounded by paths that the user can travel. Here, the block means a region surrounded by paths that the user can select.

In Embodiment 1, the block information acquisition unit 202 acquires the coordinate values that indicate the outer edges of each block.

A block extraction unit 203 extracts blocks existing between the current position of the user and the current position(s) of one or more targets. The block extraction unit 203 includes a straight line generation unit 205 and an intersecting block extraction unit 206.

The straight line generation unit 205 generates a straight line connecting the coordinate value of the current position of the user and the coordinate value of the current position(s) of one or more targets to each other. The intersecting block extraction unit 206 extracts the blocks that intersect the straight line thus generated. FIG. 3 shows a diagram illustrating blocks and a diagram illustrating extracted blocks in the path selection assistance device 1 according to Embodiment 1 of the present invention.

Figure 3B:
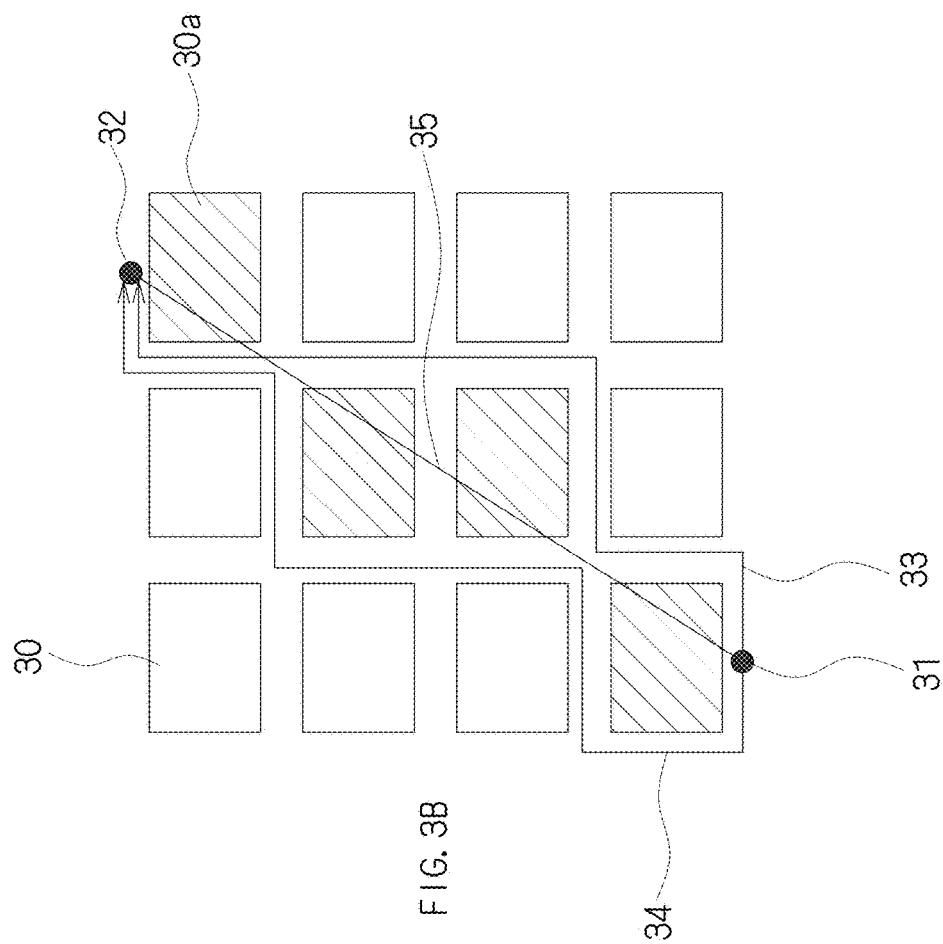
FIG. 3 shows a diagram illustrating blocks and a diagram illustrating extracted blocks in the path selection assistance device according to Embodiment 1 of the present invention.
Figure 3A:
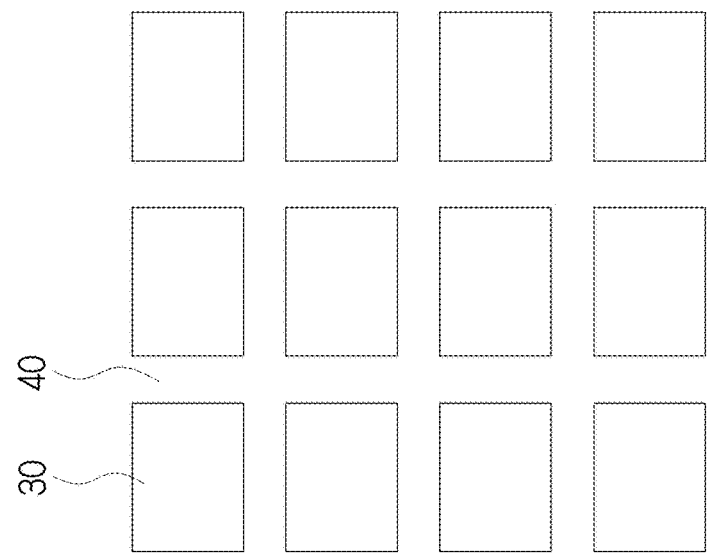

FIG. 3A is a diagram illustrating blocks displayed from map information of, for example, Kyoto city, in the case where each block has a rectangular shape. In this manner, gaps 40 between blocks 30 indicate paths that can be selected, which are path candidates that the user can select. The user can move along the outer edges of the blocks 30, that is, along the gaps (paths) 40.

FIG. 3B is a diagram illustrating a block display mode of blocks in the case where the user moves from the current position 31 to the destination 32. As shown in FIG. 3B, first, a straight line 35 connecting the current position 31 of the user and the destination 32 is generated. Then, the blocks 30 intersecting the straight line 35 thus generated are extracted as intersecting blocks, and the display mode of the intersecting blocks thus extracted is updated to display them. In FIG. 3B, the hatched blocks 30a show the extracted intersecting blocks.

Returning to FIG. 2, a block display update unit 204 updates the display mode of the extracted intersecting blocks 30a to display them. This allows the user to select a path along the outer edges of the intersecting blocks whose display mode is updated to display them, which, in the example of FIG. 3, are the hatched intersecting blocks. For example, the user may select a path 33 shown in FIG. 3B, or even in the case of selecting a path 34, the user can reliably reach the destination 32.

The operation of the path selection assistance device 1 according to Embodiment 1 of the present invention will be described based on more specific map information. FIG. 4 shows diagrams illustrating a block display for a user heading from Kyoto Station to Ginkakuji in the path selection assistance device 1 according to Embodiment 1 of the present invention. In the example of FIG. 4, the blocks are extracted based only on large roads of the map information, but they are not particularly limited thereto. Smaller blocks may be extracted, with back alleys and narrow roads being included.

As shown in FIG. 4A, the user who has arrived at Kyoto station as the current position 31 of the user sets the destination Ginkakuji as a destination 32 based on the map information. Next, as shown in FIG. 4B, the path selection assistance device 1 superimposes the map information and the blocks to display them, and based on the map information, among the blocks surrounded by large roads, the display mode of the intersecting blocks 30a that intersect the straight line connecting the current position 31 of the user and the destination 32 is updated to display them.

Then, as shown in FIG. 4C, with the map information being hidden, only the current position 31 of the user, the destination 32, and the intersecting blocks 30a up to the destination are displayed, so that the paths 40 that can be selected can be clearly indicated. Of course, they may be superimposed on the map information to be displayed. However, in order to achieve the purpose of reaching the destination 32, it should not be necessary to display landmarks on the way and unnecessary paths.

That is, in the path selection assistance device 1 according to Embodiment 1 of the present invention, it is sufficient if the distance perspective to the destination and the information indicating the paths that can be selected at the intersections are displayed in order to reach the destination 32. The distance perspective can be represented by the size and the number of blocks, and the paths that can be selected can be indicated as the outer edges of the blocks.

FIG. 5 shows diagrams illustrating changes in the block display due to movements of the path selection assistance device 1 according to Embodiment 1 of the present invention. First, as shown in FIG. 5A, when the user has moved from the current position 31 to the current position 31a, the user can select whether to go straight or turn right at the intersection. Then, it can be seen that the intersecting blocks 30a displayed with the display mode thereof being changed are updated to be displayed.

FIG. 5B shows the case where the user had selected to go straight and the current position 31b has moved to the next intersection. In this case, the display mode of only the blocks after the current position 31b is updated to display them. Then, when the user went straight one block and turned right to reach the current position 31c, the display mode of only the remaining two blocks is updated to display them as shown in FIG. 5C.

Figure 6A:
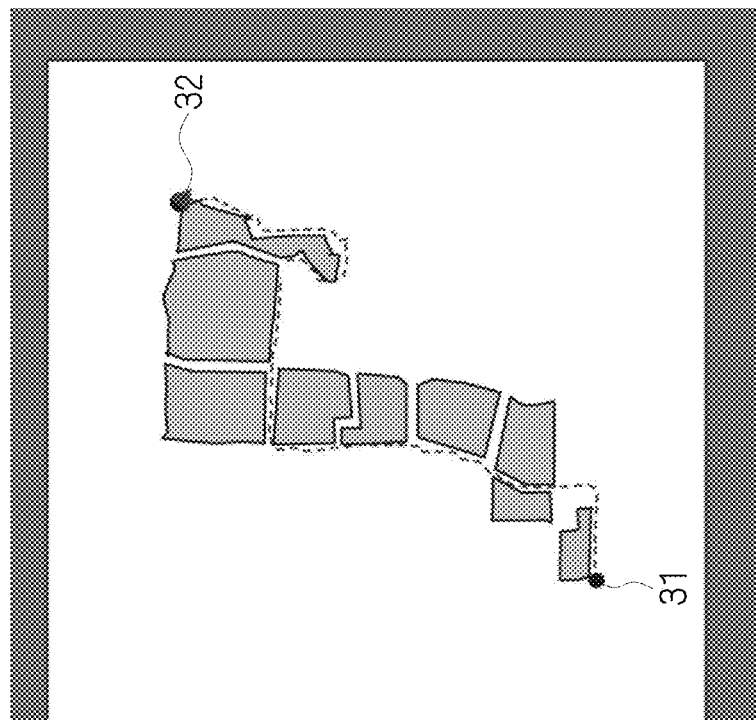
FIG. 6 shows diagrams illustrating a change in the block display when reaching the destination in the path selection assistance device according to Embodiment 1 of the present invention.

FIG. 6 shows diagrams illustrating a change in the block display when reaching the destination in the path selection assistance device 1 according to Embodiment 1 of the present invention. First, as shown in FIG. 6A, when the user went straight from the current position 31 as the departure point to move to the current position 31d, the user can select whether to turn left or turn right at the intersection. The shortest path is taken when the user makes a left turn at the current position 31d, but the user does not necessarily select the shortest path depending on the environmental factors (a lot of people, a slope, etc.) on the spot. In FIG. 6A, the user has intentionally selected to turn right at the current position 31d.

Figure 6B:
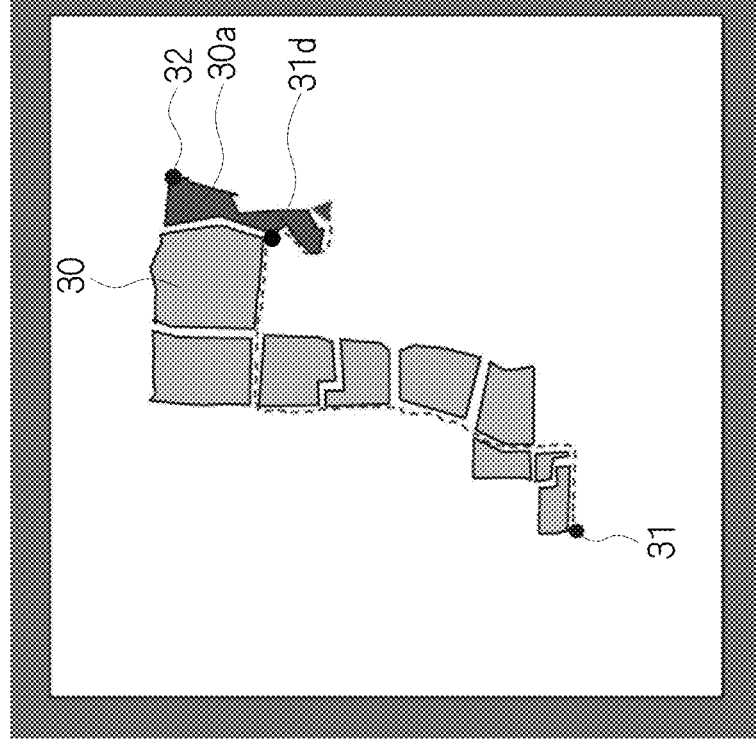

When reaching the destination 32, as shown in FIG. 6B, the intersecting block 30a whose display mode is updated to display it disappears, resulting in a state of waiting for a new destination to be set.

Figure 7:
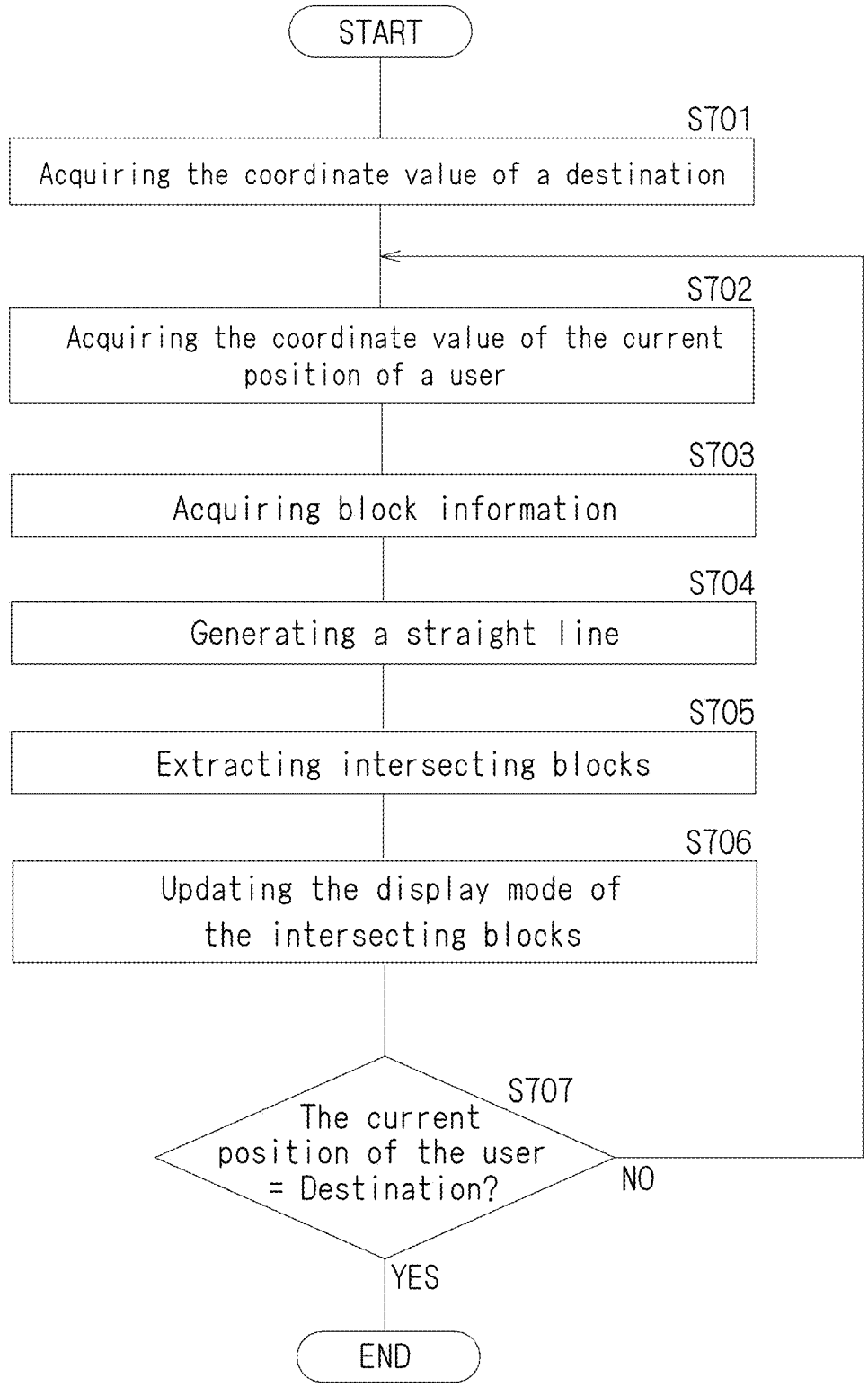
FIG. 7 is a flowchart showing a processing procedure of a CPU of the path selection assistance device according to Embodiment 1 of the present invention.

FIG. 7 is a flowchart showing a processing procedure of the CPU 11 of the path selection assistance device 1 according to Embodiment 1 of the present invention. In FIG. 7, the CPU 11 of the path selection assistance device 1 acquires the coordinate value of a destination (Step S701). In Embodiment 1, it is assumed that the destination is fixed. Therefore, the coordinate value does not need to be acquired by, for example, GPS, and the coordinate value composed of longitude and latitude may be stored beforehand.

The CPU 11 acquires the coordinate value of the current position of a user (Step S702). Since the user moves, it is preferable to acquire the coordinate value of the current position by, for example, GPS.

The CPU 11 acquires the block information including the coordinate values of blocks (Step S703). It is sufficient if the blocks for which block information is to be acquired are at least the blocks existing between the destination and the current position.

The CPU 11 generates a straight line connecting the coordinate value of the current position of the user and the coordinate value of the destination (Step S704), and extracts the intersecting blocks which are the blocks intersecting the straight line thus generated (Step S705). Specifically, blocks, in each of which the generated straight line passes through even a part of a section within the block specified by the coordinate value of the block are extracted as the intersecting blocks.

The CPU 11 updates the display mode of the intersecting blocks thus extracted (Step S706). For example, the display mode is updated so that while normal blocks are displayed in green, the intersecting blocks are displayed in red.

The CPU 11 determines whether or not the current position of the user matches the destination (Step S707). Specifically, it is determined by whether or not the coordinate values of both match each other or exist within a certain distance. When the CPU 11 determines that the current position of the user does not match the destination (Step S707: NO), the CPU 11 returns the process to Step S702 and repeats the process described above. When the CPU 11 determines that the current position of the user matches the destination (Step S707: YES), the CPU 11 determines that the user has reached the destination and ends the process.

As described above, according to Embodiment 1, since all the blocks existing between the current position and the destination to be reached can be displayed, the user can select a path that allows the user to reliably reach the destination based on the displayed blocks. Furthermore, particularly even in the case of moving slowly by foot, it is possible to reduce the possibility of wrong path selection. Even if the path selection was found to be wrong, a new path towards the destination can be easily selected again.

In addition, landmarks are not necessary as in conventional navigation systems, and even a user who tends to get lost can reliably reach the destination without being confused by surrounding landscapes, facilities, etc.

Embodiment 2

Since the configuration of a path selection assistance device 1 according to Embodiment 2 of the present invention is similar as that of Embodiment 1, detailed descriptions thereof are omitted, with the same reference numerals being used. Embodiment 2 is different from Embodiment 1 in that the destination (target) is one or more and can move.

Figure 8:
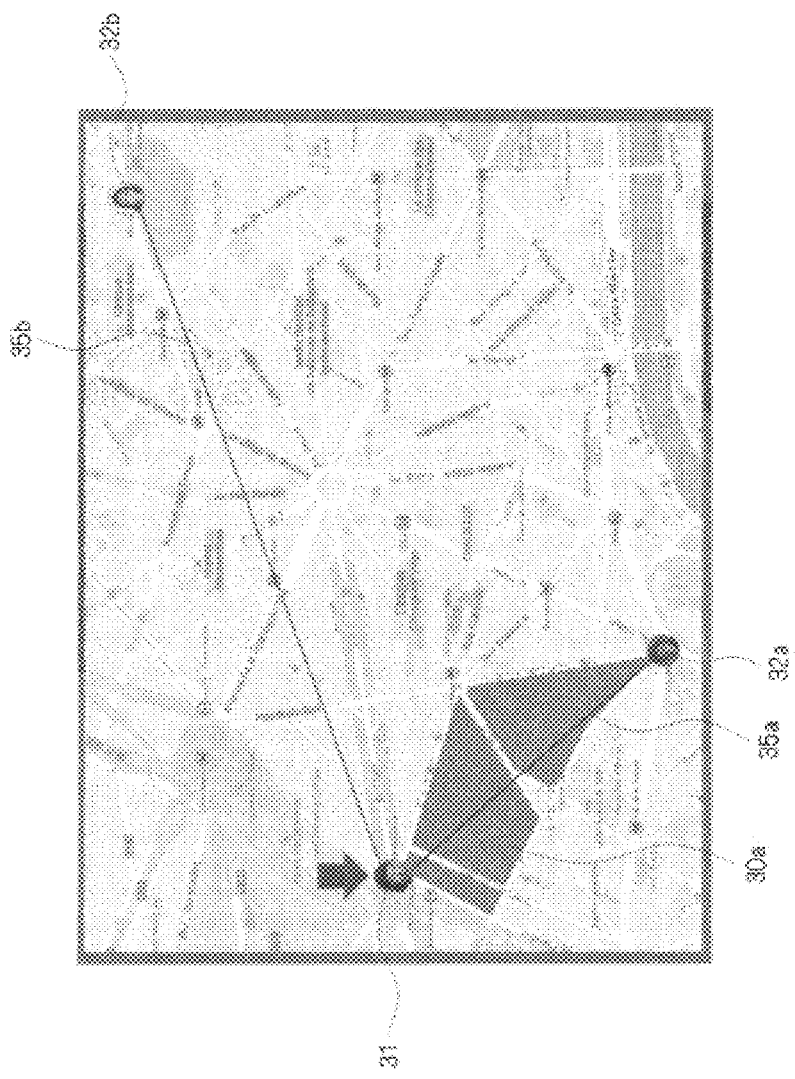
FIG. 8 is a diagram illustrating the relationship between a destination and the current position of a user of a path selection assistance device according to Embodiment 2 of the present invention.
Figure 9:
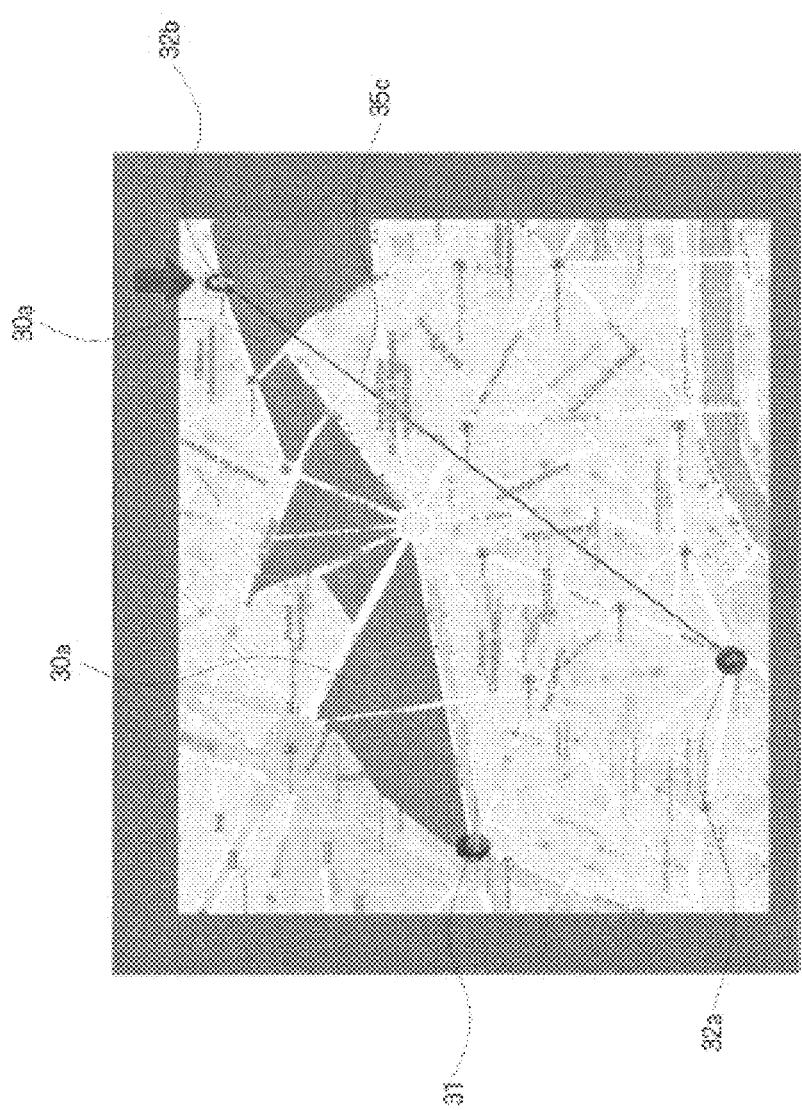
FIG. 9 is a diagram illustrating the relationship between a destination and the current position of a user of the path selection assistance device according to Embodiment 2 of the present invention.

FIG. 8 and FIG. 9 are diagrams illustrating the relationship between a destination and the current position of a user of the path selection assistance device 1 according to Embodiment 2 of the present invention. Unlike Embodiment 1, the destination is the current position of another user who can move.

Therefore, as shown in FIG. 8, the coordinate value of the current position 31 of the user and the coordinate value of the current position 32a of another user as the destination are acquired, and a straight line 35a connecting both is generated. The display mode of intersecting blocks 30a intersecting the straight line 35a thus generated is updated and thereby the paths that allow both users to come close to each other become clear, which makes it possible for them to reliably meet each other without passing each other.

Furthermore, a plurality of users may be designated as destinations. In the example of FIG. 8, the coordinate value of the current position 32b of another user as a new destination is acquired, and a straight line 35b connecting the coordinate value thus acquired and the coordinate value of the current position 31 of the user is generated. In this case, as shown in FIG. 9, the display of the intersecting blocks 30a that intersect the straight line 35b thus generated is updated.

That is, an effect unique to the present invention can be provided that even in not only a one-to-one case but also a one-to-many case, other users designated as destinations, respectively, can be switched to similarly approach (come close to) each other, and for example, a plurality of users can use the path selection assistance devices to meet each other without specifying a destination.

Figure 10:
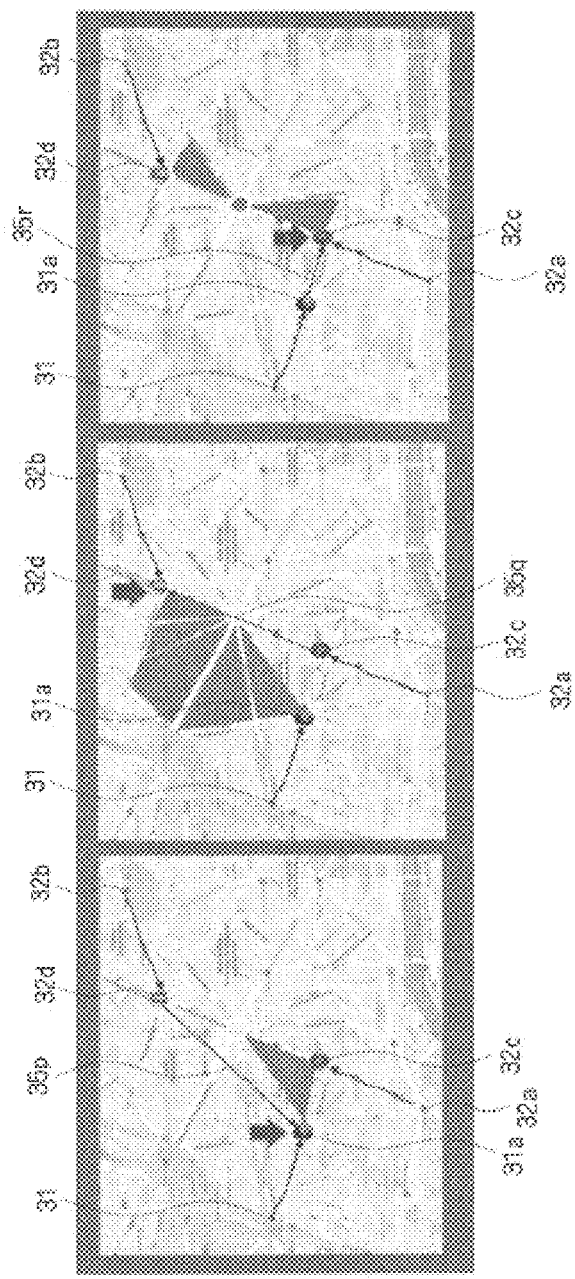
FIG. 10 shows diagrams illustrating display states of the path selection assistance devices of respective users in a one-to-many case of the path selection assistance device according to Embodiment 2 of the present invention.

FIG. 10 shows diagrams illustrating display states of the path selection assistance devices 1 of respective users in a one-to-many case of the path selection assistance device 1 according to Embodiment 2 of the present invention. In FIG. 10, a user (hereinafter referred to as User 1) at the current position 31, a user (hereinafter referred to as User 2) at the current position 32a, and a user (hereinafter referred to as User 3) at the current position 32b have moved to a current position 31a, a current position 32c, and a current position 32d, respectively.

For example, FIG. 10A is a diagram illustrating a screen displayed on the path selection assistance device 1 when User 1 and User 2 are selected.

In this case, in the path selection assistance device 1, the display mode of the intersecting block 30a intersecting the straight line (35r in FIG. 10C) generated between User 1 and User 2 has been updated to display it. Of course, instead of User 2, User 3 may be selected as a path selection target. In this case, a straight line 35p is generated between User 1 and User 3, and the display mode of the intersecting blocks 30a intersecting the straight line 35p thus generated is updated to display them.

FIG. 10B is a diagram illustrating a screen that is displayed when the display mode of the intersecting blocks 30a intersecting the generated straight line 35p is updated. Of course, User 2 may be selected as a path selection target instead of User 1. In this case, a straight line 35q is generated between User 2 and User 3, and the display mode of the intersecting blocks 30a intersecting the straight line 35q thus generated is updated to display them.

FIG. 10C is a diagram illustrating a screen that is displayed when the display mode of the intersecting blocks 30a intersecting the generated straight line 35q is updated.

In this way, users who want to meet each other can be selected as destinations, and the display mode of the intersecting blocks that allows each selected user to select a path can be updated to display them. Thus, the user can always check which path can be taken to reliably meet another user and thereby it is possible to avoid passing each other.

Figure 11:
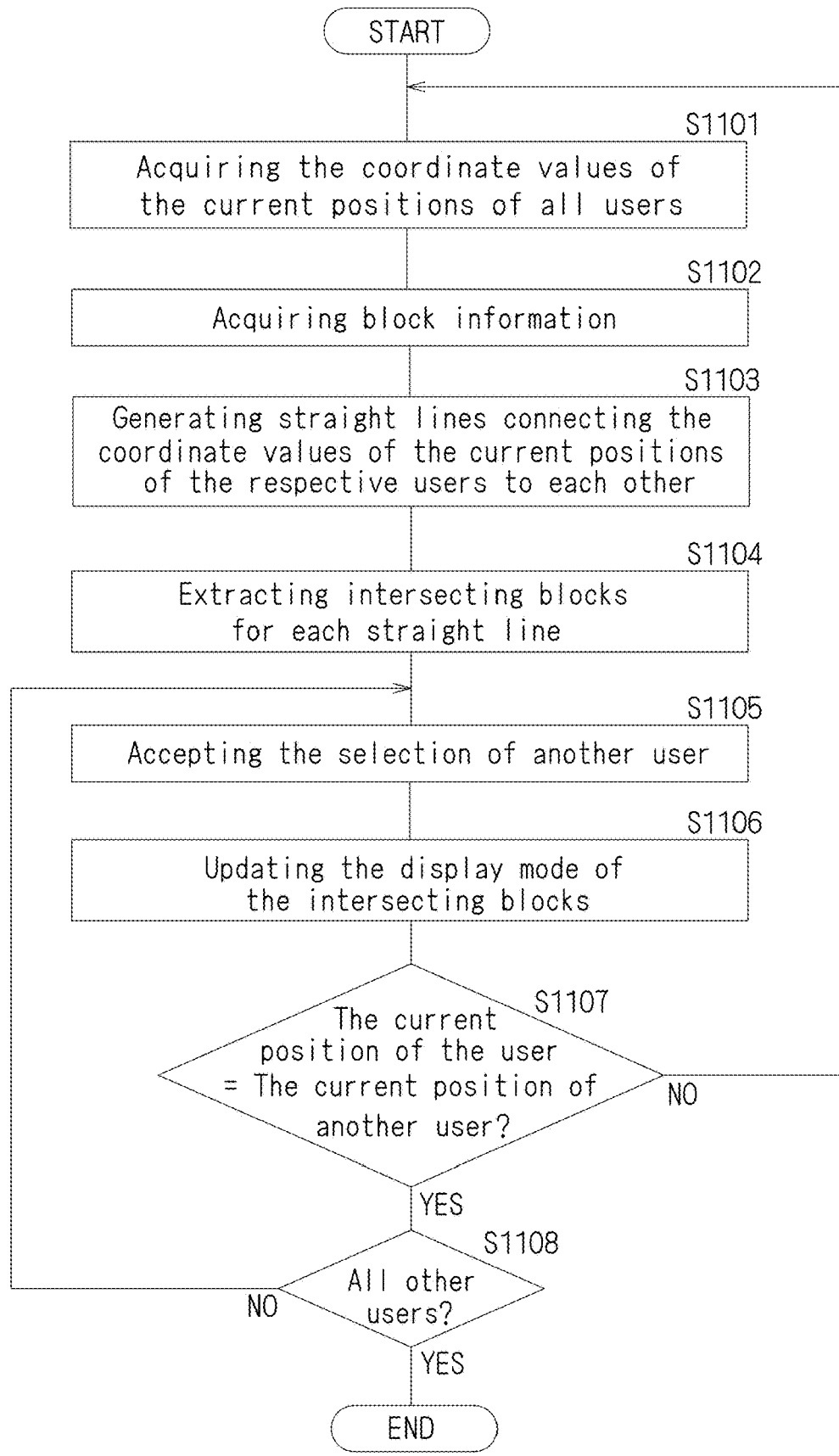
FIG. 11 is a flowchart showing a processing procedure of a CPU of the path selection assistance device according to Embodiment 2 of the present invention.

FIG. 11 is a flowchart showing a processing procedure of the CPU 11 of the path selection assistance device 1 according to Embodiment 2 of the present invention. In FIG. 11, the CPU 11 of the path selection assistance devices 1 acquires the coordinate value of the current position of a user carrying the path selection assistance device 1 and the coordinate value of the current position of another user (Step S1101). In Embodiment 2, since all the users can move, the coordinate value of the current position of the user and the coordinate values of the current positions of a plurality of other users are acquired by, for example, GPS.

The CPU 11 acquires the block information including the coordinate values of blocks (Step S1102). It is sufficient if the blocks for which block information is to be acquired are at least the blocks existing between the respective users.

The CPU 11 generates straight lines connecting the coordinate values of the current positions of the respective users to each other (Step S1103). For each of a plurality of straight lines thus generated, the CPU 11 extracts the intersecting blocks which are the blocks intersecting the straight line (Step S1104). Specifically, for each straight line, blocks, in each of which the straight line passes through even a part of a section thereof, are extracted as the intersecting blocks.

The CPU 11 accepts the selection of another user (Step S1105). The CPU 11 updates the display mode of the extracted intersecting blocks that intersect the straight line generated between the coordinate value of the current position of the user and the coordinate value of the current position of another user who was selected to be accepted (Step S1106). For example, the display mode is updated so that while the normal blocks are displayed in green, the intersecting blocks are displayed in red.

The CPU 11 determines whether or not the current position of the user matches the current position of another user (destination) (Step S1107). Specifically, it determines whether or not the coordinate values of both match each other or the distance between both is not more than a certain distance. When the CPU 11 determines that the current position of the user does not match the current position of another user (Step S1107: NO), the CPU 11 returns the process to Step S1101 and repeats the process described above. When the CPU 11 determines that the current position of the user matches the current position of another user (Step S1107: YES), the CPU 11 determines whether or not selections of all other users have been accepted (Step S1108).

When the CPU 11 determines that there is another user who has not yet been selected to be accepted (Step S1108: NO), the CPU 11 returns the process to step S1105 and repeats the process described above. When the CPU 11 determines that selections of all other users have been accepted (Step S1108: YES), the CPU 11 determines that the user has met all other users and ends the process.

As described above, according to Embodiment 2, even in the case where a plurality of users move to meet each other, since all the blocks existing between the user and another user until they reach (can meet) each other can be displayed, they can select paths that allow them to reliably meet each other. In addition, even if the path selection was found to be wrong, a new path that allows them to approach each other can be easily selected again.

Embodiment 3

Since the configuration of a path selection assistance device 1 according to Embodiment 3 of the present invention is similar as those of Embodiments 1 and 2, detailed descriptions thereof are omitted, with the same reference numerals being used. Embodiment 3 is different from Embodiments 1 and 2 in that the destination (target) is a region having a certain area.

FIG. 12 shows a diagram illustrating blocks and a diagram illustrating extracted blocks in the path selection assistance device 1 according to Embodiment 3 of the present invention. FIG. 12A is a diagram illustrating blocks displayed from map information of, for example, Kyoto city, in the case where each block has a rectangular shape. In this manner, gaps 40 between blocks 30 indicate roads, and the user can move along the outer edges of the blocks 30, that is, along the gaps (paths) 40. Then, the user moves from the current position 31 of the user to the destination 50 designated as a region.

FIG. 12B is a diagram illustrating a display mode of the blocks 30 in the case where the user moves from the current position 31 of the user to the destination 50. As shown in FIG. 12B, the path selection assistance device 1 first generates circumscribed lines 51 and 52 that circumscribe the destination 50 from the coordinate value of the current position 31 of the user. Then, the blocks 30 that exist, even if only partially, within the region between the circumscribed lines 51 and 52 thus generated are extracted as intersecting blocks 30a, and then the display mode thereof is updated to display them. FIG. 12B shows that the hatched blocks 30 are the extracted intersecting blocks 30a.

That is, in Embodiment 3, unlike Embodiments 1 and 2, the destination is not a single coordinate value but a certain region. For example, when tens of thousands of people gather in a certain region, for example, at an outdoor concert venue, it is possible to select a path for reaching the venue from a wide range. Of course, upon entering the region, a selection to change the destination to a specific user may be accepted as in Embodiment 2. This also makes it possible to check each other so as to meet each other inside the region.

Figure 13:
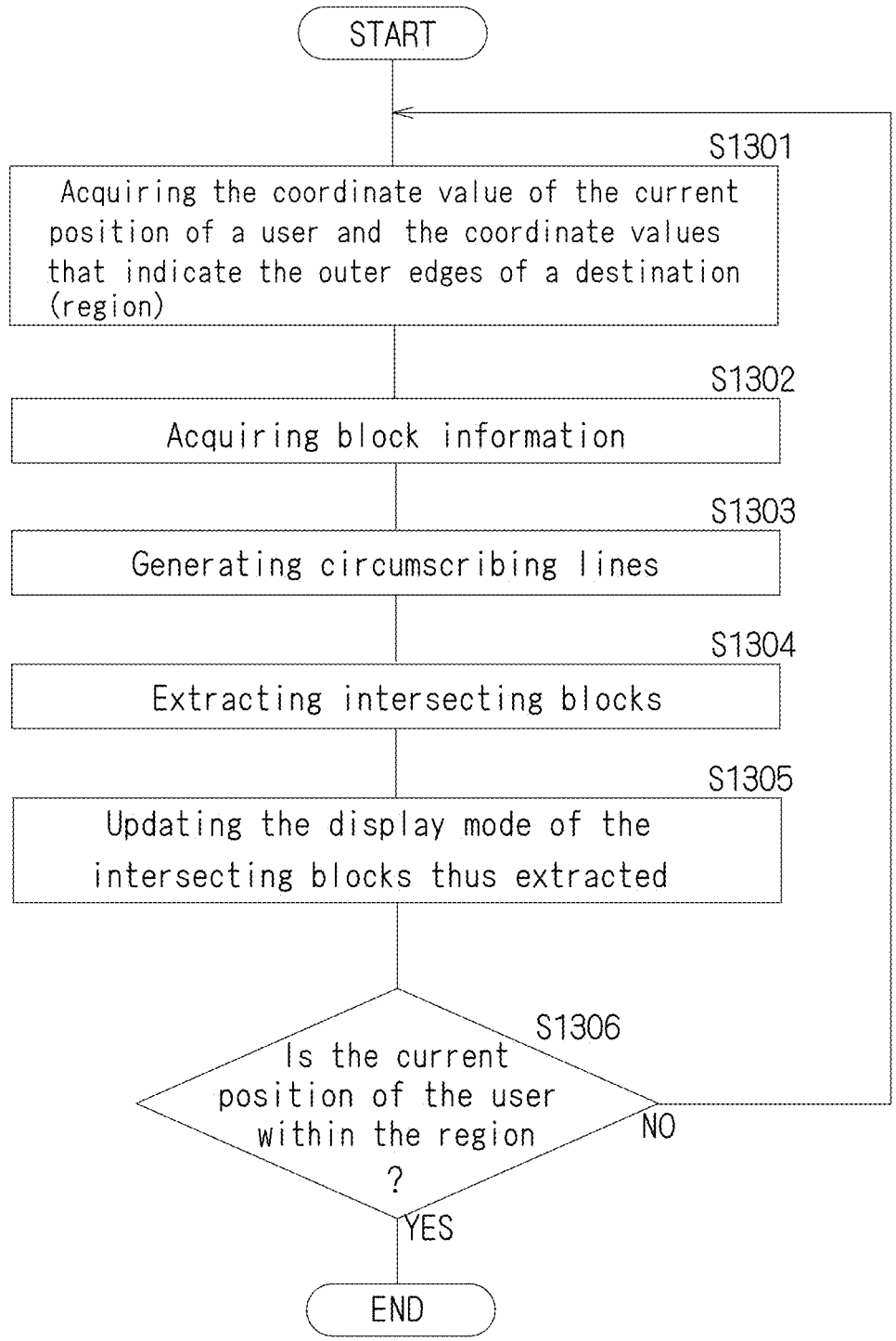
FIG. 13 is a flowchart showing a processing procedure of a CPU of the path selection assistance device according to Embodiment 3 of the present invention.

FIG. 13 is a flowchart showing a processing procedure of the CPU 11 of the path selection assistance device 1 according to Embodiment 3 of the present invention. In FIG. 13, the CPU 11 of the path selection assistance device 1 acquires the coordinate value of the current position of a user carrying the path selection assistance device 1 and the coordinate values that indicate the outer edges of a destination region (Step S1301). In Embodiment 3, since the user can move, the coordinate value of the current position of the user is acquired by, for example, GPS.

The CPU 11 acquires the block information including the coordinate values of the blocks (Step S1302). It is sufficient if the blocks for which the block information is to be acquired are at least the blocks existing between the destination and the user.

The CPU 11 generates two circumscribing lines that circumscribe the destination region from the coordinate value of the current position of the user (Step S1303), and extracts the intersecting blocks which are the blocks intersecting the region between the two circumscribed lines thus generated (Step S1304). Specifically, blocks, in each of which the two circumscribed lines pass through even a part of a section within the block specified by the coordinate value of the block, and blocks existing in the region between the two circumscribed lines are extracted as the intersecting blocks.

The CPU 11 updates the display mode of the intersecting blocks thus extracted (Step S1305). For example, the display mode is updated so that while the normal blocks are displayed in green, the intersecting blocks are displayed in red.

The CPU 11 determines whether or not the coordinate value of the current position of the user falls within the destination region (Step S1306). When the CPU 11 determines that it does not fall within the destination region (Step S1306: NO), the CPU 11 returns the process to Step S1301 and repeats the process described above. If the CPU 11 determines that it falls within the destination region (Step S1306: YES), the CPU 11 determines that the user has reached the destination and ends the process.

As described above, according to Embodiment 3, even in the case of a destination having a certain area such as a concert venue, since all the blocks existing until reaching the destination can be displayed, a path that allows the user to reliably reach the destination can be selected. Furthermore, particularly even in the case of moving slowly by foot, it is possible to reduce the possibility of wrong path selection. Even if the path selection was found to be wrong, a new path towards the destination can be easily selected again.

The present invention is not limited to the embodiments described above, and various modifications, improvements, etc. are possible as long as they are within the scope of the spirit of the present invention. For example, a message input/output area may be prepared in the screen where the extracted blocks are displayed, so that messages may be exchanged among a plurality of users.

Figure 14:
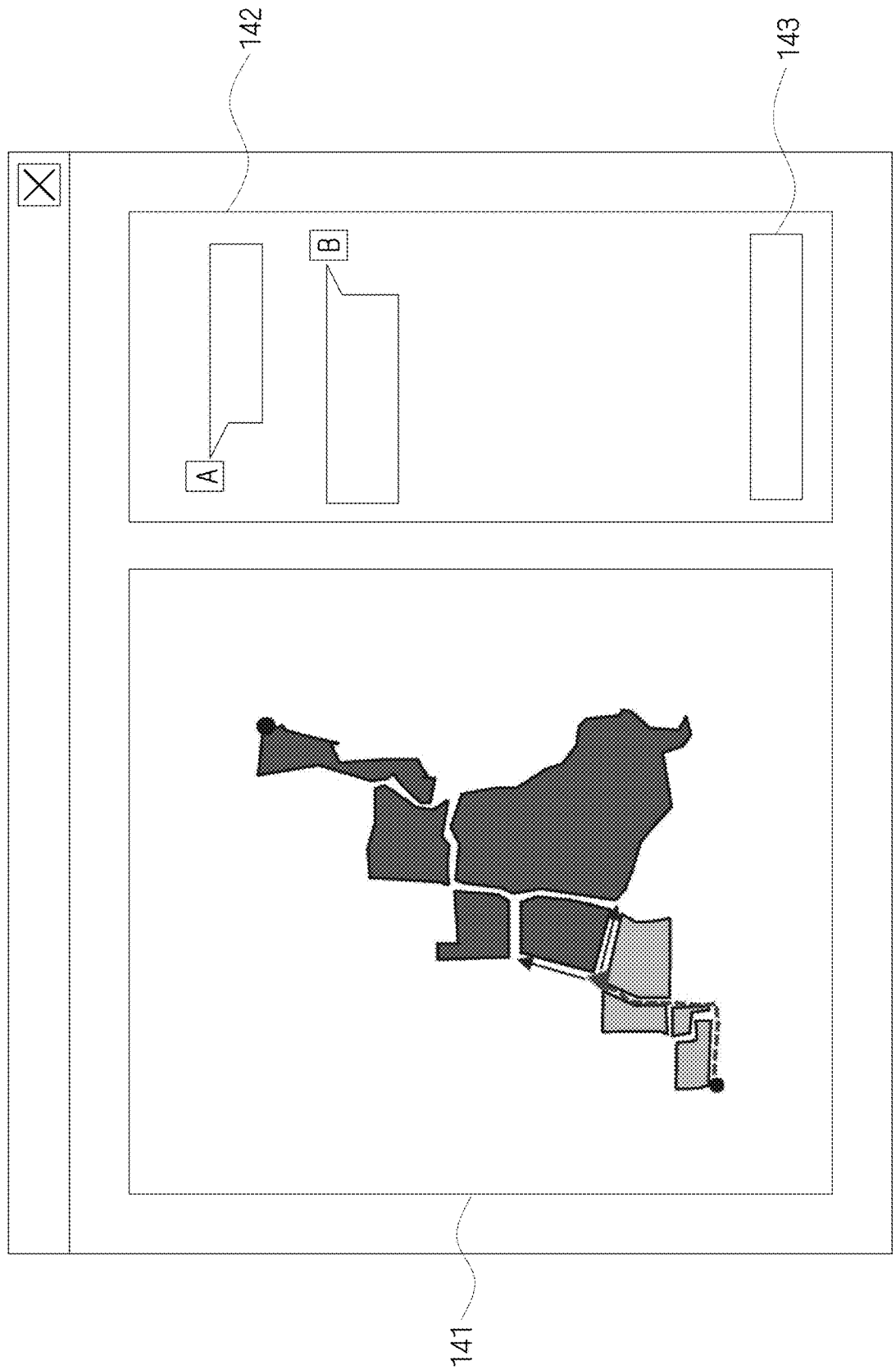
FIG. 14 is a diagram illustrating a display screen of the path selection assistance device according to the embodiments of the present invention.

FIG. 14 is a diagram illustrating a display screen of the path selection assistance device 1 according to the embodiments of the present invention. The example of FIG. 14 shows the display screen of the path selection assistance device 1 carried by user A. As shown in FIG. 14, while blocks existing between the current position of the user and the destination are displayed in the path display area 141, a message exchange area 142 (a message exchange means) is provided in which messages of user A and another user B as the destination can be inputted and outputted.

In the example of FIG. 14, in the message exchange area 142, the status of message exchange between user A and another user B is displayed. When a message is inputted to an input area 143, it is displayed as a message of user A in the message exchange area 142. This allows the users to select a more reliable path to meet each other.

With respect to the map information, a map information server may be provided separately and only necessary map information may be downloaded, or it may be stored beforehand in the path selection assistance device 1. Furthermore, information on the altitude of the terrain may be used to vary the display mode of the blocks. For example, even in the same color, blocks with high average altitude are displayed with darker colors and blocks with low average altitude are displayed with lighter colors, so that it can be assumed that a path where a dark color block and a light color block are in contact with each other is a road with a large height difference.

Figure 15:
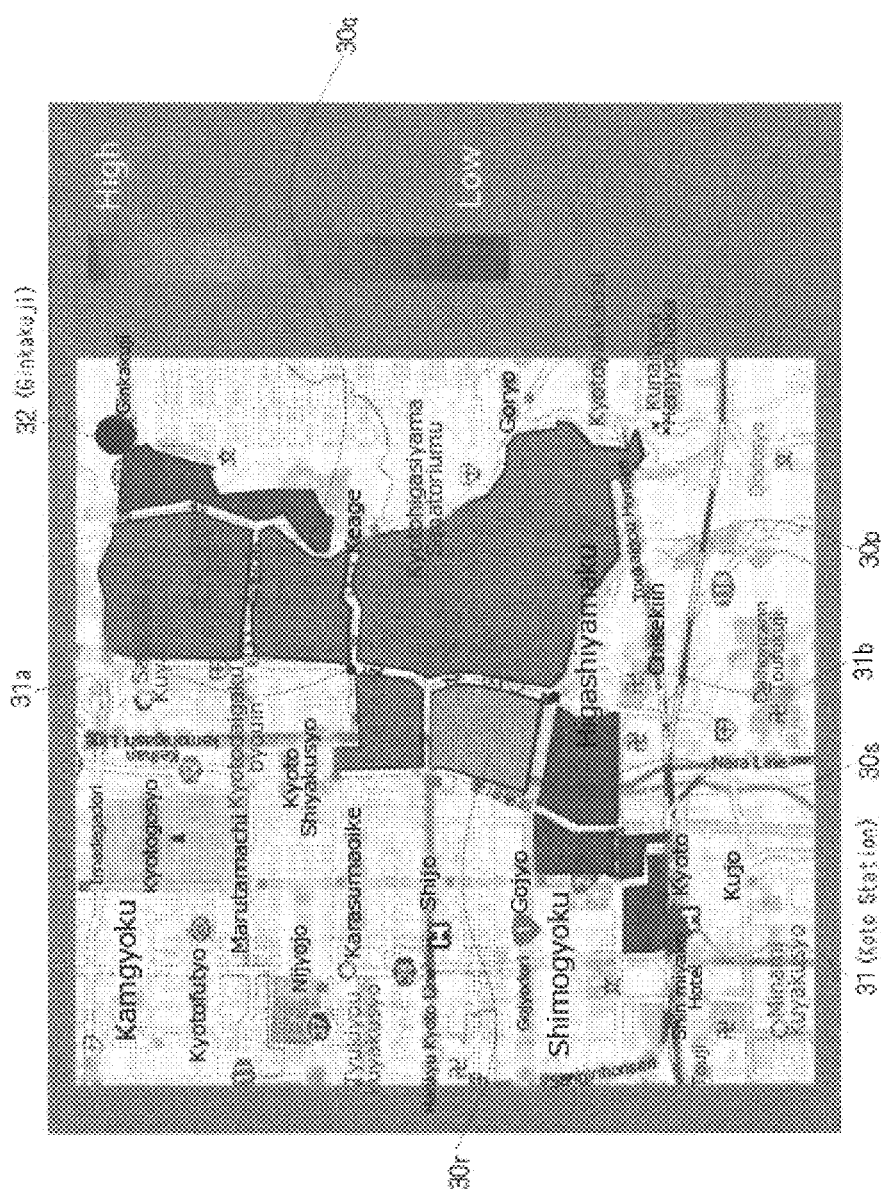
FIG. 15 is a diagram illustrating a display screen displaying blocks with information on the land altitude of the path selection assistance device according to the embodiments of the present invention.

FIG. 15 is a diagram illustrating a display screen displaying blocks with information on the land altitude of the path selection assistance device 1 according to the embodiments of the present invention. In the example shown in FIG. 15, the average altitude is calculated per block, and each block is displayed with shading corresponding to its altitude even in the same color.

For example, the block 30p and the block 30q are displayed with the same color shade. Therefore, this indicates that at the current position 31a of the user, regardless of whether the user goes straight or turns right, there are no extreme slopes in either path.

On the other hand, it can be seen that the block 30r has a lower average altitude when comparing the block 30p and the block 30r with each other and that the block 30r has a lower average altitude also when comparing the block 30s and the block 30r with each other. On the other hand, since the block 30s has a higher average altitude than that of the block 30p, at the current position 31b of the user, the road may be steeper if the user turns left rather than going straight north. In this way, it is possible to add a variation of selecting a path while avoiding slopes.

Furthermore, the method of extracting blocks in the block extraction unit 203 is not limited to the method of extracting blocks intersecting a straight line as described above. Any method may be used as long as it is a method that can extract blocks that allow the user to reliably reach the destination, for example, that extracts blocks existing around the shortest path determined by a well-known method.

DESCRIPTIONS OF REFERENCE NUMERALS

1 Path Selection Assistance Device
11 CPU

12 Memory
13 Storage Device
14 I/O Interface
15 Video Interface
16 Portable Disk Drive
17 Communication Interface
18 Internal Bus
90 Portable Recording Medium
100 Computer Program

The invention claimed is:

1. A path selection assistance device for displaying information indicating paths configured to be selected by a user, the path selection assistance device comprising:
 a memory; and
 a processor coupled to the memory and configured to:
 acquire position information on a current position of a user and on a current position of at least one target,
 acquire position information of a block which is a closed region surrounded by paths configured to be traveled by the user,
 extract a block existing between the current position of the user and the current position of the at least one target, and
 update a display mode of the extracted block and display the extracted block.

2. The path selection assistance device according to claim 1, wherein the processor is further configured to:
 generate a straight line connecting the current position of the user and the current position of the at least one target, and
 extract a block intersecting the straight line thus generated.

3. The path selection assistance device according to claim 2, wherein the processor is further configured to acquire boundary coordinate values of a region having a predetermined area as the position information on the current position of the target.

4. The path selection assistance device according to claim 2, wherein the processor is further configured to download block position information stored on an external computer.

5. The path selection assistance device according to claim 2, wherein the processor is further configured to superimpose map information and the extracted block to display them.

6. The path selection assistance device according to claim 2, wherein the processor is further configured to:
 display the extracted block in a message input/output area in a screen, and
 exchange messages among a plurality of users.

7. The path selection assistance device according to claim 2, wherein the target is configured to move.

8. The path selection assistance device according to claim 1, wherein the processor is further configured to acquire boundary coordinate values of a region having a predetermined area as the position information on the current position of the target.

9. The path selection assistance device according to claim 1, wherein the processor is further configured to download block position information stored on an external computer.

10. The path selection assistance device according to claim 1, wherein the path selection assistance device superimposes map information and the extracted block to display them.

11. The path selection assistance device according to claim 1, wherein the path selection assistance device comprises:
 a message input/output area in a screen where the extracted block is displayed, and
 a message exchange for exchanging messages among a plurality of users.

12. The path selection assistance device according to claim 1, wherein the target is configured to move.

13. A path selection assistance method configured to be executed with a path selection assistance device for displaying information indicating paths configured to be selected by a user,
 the path selection assistance device
 performing the operations of:
 acquiring position information on a current position of a user and on a current position of at least one target,
 acquiring position information of a block which is a closed region surrounded by paths configured to be traveled by the user,
 extracting a block existing between the current position of the user and the current position of the at least one target, and
 updating a display mode of the block and displaying the extracted block.

14. The path selection assistance method according to claim 13, wherein the path selection assistance device further performs the operations of:
 generating a straight line connecting the current position of the user and the current position of the at least one target, and
 extracting a block intersecting the straight line thus generated.

15. The path selection assistance method according to claim 14, wherein the path selection assistance device acquires boundary coordinate values of a region having a predetermined area as the position information on the current position of the target.

16. The path selection assistance method according to claim 14, wherein the path selection assistance device downloads block position information stored on an external computer.

17. The path selection assistance method according to claim 13, wherein the path selection assistance device acquires boundary coordinate values of a region having a predetermined area as the position information on the current position of the target.

18. The path selection assistance method according to claim 13, wherein the path selection assistance device downloads block position information stored on an external computer.

19. A computer memory product recording a computer program configured to be executed by a path selection assistance device for displaying information indicating paths configured to be selected by a user,
 the path selection assistance device being configured to perform the operations of:
 acquiring position information on a current position of a user and on a current position of at least one target,
 acquiring position information of a block which is a closed region surrounded by paths configured to be traveled by the user,
 extracting a block existing between the current position of the user and the current position of the at least one target, and
 updating the display mode of the extracted block and displaying the extracted block.

20. The computer memory product recording a computer program according to claim 19, wherein the path selection assistance device is further configured to perform the operations of:
    generating a straight line connecting the current position of the user and the current position of the at least one target, and
    extracting a block intersecting the straight line thus generated.

\* \* \* \* \*